US011296948B2

(12) United States Patent
Li

(10) Patent No.: US 11,296,948 B2
(45) Date of Patent: Apr. 5, 2022

(54) TOPOLOGY PARTITION DETECTION

(71) Applicant: Arista Networks, Inc., Santa Clara, CA (US)

(72) Inventor: Anthony Joseph Li, Los Altos, CA (US)

(73) Assignee: Arista Networks, Inc., Santa Clara, CA (US)

(*) Notice: Subject to any disclaimer, the term of this patent is extended or adjusted under 35 U.S.C. 154(b) by 149 days.

(21) Appl. No.: 16/739,041

(22) Filed: Jan. 9, 2020

(65) Prior Publication Data

US 2021/0218633 A1 Jul. 15, 2021

(51) Int. Cl.
*H04L 12/24* (2006.01)
*H04L 41/12* (2022.01)
*H04L 43/0811* (2022.01)
*H04L 41/14* (2022.01)

(52) U.S. Cl.
CPC .............. *H04L 41/12* (2013.01); *H04L 41/14* (2013.01); *H04L 43/0811* (2013.01)

(58) Field of Classification Search
CPC ....... H04L 41/12; H04L 41/14; H04L 43/0811
See application file for complete search history.

(56) References Cited

U.S. PATENT DOCUMENTS

| 6,349,091 B1 | 2/2002 | Li |
| 7,177,951 B1 | 2/2007 | Dykeman et al. |
| 7,281,057 B2 | 10/2007 | Cain |
| 8,214,447 B2 | 7/2012 | Deslippe et al. |
| 8,917,708 B2 | 12/2014 | Venkatachalam et al. |
| 8,995,303 B1 | 3/2015 | Brar et al. |
| 9,253,663 B2 | 2/2016 | Raleigh et al. |
| 9,491,089 B2 | 11/2016 | Bhatt et al. |
| 9,584,363 B1 | 2/2017 | Olson |
| 9,674,193 B1 | 6/2017 | Madasamy |
| 9,712,390 B2 | 7/2017 | Lissack |
| 9,760,598 B1 | 9/2017 | Holenstein et al. |

(Continued)

FOREIGN PATENT DOCUMENTS

EP 3400678 11/2018

OTHER PUBLICATIONS

"Information technology—Telecommunications and information exchange between systems—Intermediate System to Intermediate System intra-domain routeing information exchange protocol for use in conjunction with the protocol for providing the connectionless-mode network service (ISO 8473)"; ISO/IEC 10589:2002(E); 2002.

(Continued)

*Primary Examiner* — Samina F Choudhry
(74) *Attorney, Agent, or Firm* — Chamberlain, Hrdlicka, White, Williams & Aughtry

(57) ABSTRACT

Techniques described herein relate to a method for topology partition detection. Network devices within a network topology often share information to achieve desired network functionality. However, when a network topology becomes partitioned such that not all network devices are directly or indirectly connected to the other network devices, the information sharing may fail. Techniques described herein detect such network topology partitioning by analyzing information that represents the network topology, and the connections therein (e.g., a set of paths).

14 Claims, 7 Drawing Sheets

Network Topology 100

(56) References Cited

U.S. PATENT DOCUMENTS

| | | | |
|---|---|---|---|
| 9,984,140 | B1 | 5/2018 | Sukumaran et al. |
| 10,218,610 | B2 | 2/2019 | Frost et al. |
| 10,379,890 | B1 | 8/2019 | Mehta et al. |
| 10,469,360 | B1 | 11/2019 | Bhat et al. |
| 10,623,285 | B1 | 4/2020 | Shevade |
| 2003/0115364 | A1 | 6/2003 | Shu et al. |
| 2003/0179707 | A1 | 9/2003 | Bare |
| 2004/0143425 | A1 | 7/2004 | Rosenberg |
| 2005/0036500 | A1 | 2/2005 | Rodeheffer et al. |
| 2005/0170852 | A1 | 8/2005 | Li et al. |
| 2005/0265260 | A1 | 12/2005 | Zinin et al. |
| 2007/0070920 | A1 | 3/2007 | Oyamada |
| 2007/0124375 | A1 | 5/2007 | Vasudevan et al. |
| 2007/0280102 | A1 | 12/2007 | Vasseur et al. |
| 2009/0144443 | A1 | 6/2009 | Vasseur et al. |
| 2009/0158387 | A1 | 6/2009 | Huang |
| 2009/0245137 | A1 | 10/2009 | Hares et al. |
| 2010/0057563 | A1 | 3/2010 | Rauber et al. |
| 2010/0103846 | A1* | 4/2010 | Chiabaut ............... H04L 45/122 370/256 |
| 2010/0296414 | A1 | 11/2010 | Vohra et al. |
| 2011/0103228 | A1 | 5/2011 | Sheth et al. |
| 2011/0116369 | A1 | 5/2011 | Hu et al. |
| 2012/0087304 | A1 | 4/2012 | Porat |
| 2012/0201539 | A1 | 8/2012 | Boertjes et al. |
| 2012/0294187 | A1* | 11/2012 | Chau .................... H04L 45/70 370/254 |
| 2013/0077621 | A1 | 3/2013 | Jacob Da Silva et al. |
| 2013/0121156 | A1 | 5/2013 | Rege et al. |
| 2013/0136138 | A1 | 5/2013 | Miller et al. |
| 2013/0145461 | A1 | 6/2013 | Barton' et al. |
| 2013/0173876 | A1 | 7/2013 | Namjoshi |
| 2013/0311229 | A1 | 11/2013 | Hadar et al. |
| 2014/0010069 | A1* | 1/2014 | Abbasi ................ H04L 45/126 370/221 |
| 2014/0043956 | A1 | 2/2014 | Mirtorabi et al. |
| 2014/0219103 | A1 | 8/2014 | Vasseur et al. |
| 2014/0233422 | A1 | 8/2014 | Thubert et al. |
| 2014/0269421 | A1 | 9/2014 | Previdi et al. |
| 2014/0269725 | A1 | 9/2014 | Filsfils et al. |
| 2015/0055652 | A1 | 2/2015 | Yong et al. |
| 2015/0127789 | A1 | 5/2015 | Lissack |
| 2015/0188760 | A1 | 7/2015 | Anumala et al. |
| 2015/0350314 | A1 | 12/2015 | Miller et al. |
| 2016/0027292 | A1 | 1/2016 | Kerning |
| 2016/0094398 | A1 | 3/2016 | Choudhury et al. |
| 2016/0134482 | A1 | 5/2016 | Beshai |
| 2016/0164716 | A1 | 6/2016 | Dusi |
| 2016/0248656 | A1 | 8/2016 | Anand et al. |
| 2016/0248658 | A1 | 8/2016 | Patel et al. |
| 2017/0195218 | A1 | 7/2017 | Schrum, Jr. et al. |
| 2017/0353360 | A1 | 12/2017 | Hayashitani et al. |
| 2018/0041360 | A1 | 2/2018 | Shen et al. |
| 2018/0176082 | A1 | 6/2018 | Katz et al. |
| 2018/0176093 | A1 | 6/2018 | Katz et al. |
| 2019/0104061 | A1 | 4/2019 | Zhang et al. |
| 2019/0329768 | A1 | 10/2019 | Shalev-shwartz et al. |
| 2021/0119910 | A1 | 4/2021 | Chen et al. |

OTHER PUBLICATIONS

J. Moy; "OSPF Version 2"; STD 54, RFC 2328; DOI 10.17487/RFC2328, Apr. 1998; https://tools.ietf.org/html/rfc2328.

R. Coltun et al.; "OSPF for IPv6"; RFC 5340; DOI 10.17487/RFC5340, Jul. 2008; https://tools.ietf.org/html/rfc5340.

C. Filsfils et al.; "Segment Routing Architecture, draft-ietf-spring-segment-routing-13" Oct. 2017; https://tools.ietf.org/id/draft-ietf-spring-segment-routing-13.html.

N. Shen et al.; "IS-IS Routing for Spine-Leaf Topology"; Internet Draft, Networking Working Group; Jan. 2, 2018; XP015124979.

T. Li, Arista Networks; "Dynamic Flooding for IS-IS"; Internet Draft, Internet Engineering Task Force; Jan. 7, 2018; XP015125062.

T. Li, Arista Networks; "Dynamic Flooding on Dense Graphs"; Internet Draft, Internet Engineering Task Force; Mar. 26, 2018.

Chen Futurewei et al., "Flooding Topology Computation Algorithm; draft-cc-1sr-flodding-reduction-04", Network Working Group, Jul. 8, 2019, pp. 1-9, XP015133971 (8 pages).

Chen T Li et al., "An Algorithm for Computing Dynamic Flooding Topologies; draft-chen-lsr-dynamic-flooding-algorithm-00", Internet Engineering Task Force, Mar. 3, 2020, pp. 1-9, XP015138043 (9 pages).

Frank R et al., "EDFS A Novel Flooding Protocol for Multi-Hop Wireless Networks", The Seventh International Conference on Wireless On-demand Network Systems and Services; IEEE/IFIP WONS 2010, Feb. 3, 2010, pp. 99-105, XP031652457 (7 pages).

Li T et al., "Dynamic Flooding on Dense Graphs; draft-ietf-1sr-dynamic-flooding-04", Internet Engineering Task Force, Nov. 26, 2019, pp. 1-47, XP015136693 (47 pages).

* cited by examiner

TOPOLOGY PARTITION DETECTION

BACKGROUND

Networks of interconnected devices (e.g., computer networks) often include any number of network devices. Such network devices may be arranged in a network topology in order to provide connectivity between devices within and outside of the network. A network topology may be represented as a graph of interconnected nodes. Within such network topologies, routing protocols are often implemented that distribute certain information, at least in part, by sharing the information (e.g., routing information) between network devices (e.g., in packets) in the network topology. In order for network devices in the network topology to share such information, the information from each node (e.g., what neighbor devices is the network device directly connected to, what does the network device know about the topology, etc.) may be shared, directly or indirectly, with the other nodes in the network topology. However, conditions may exist in one or more network devices (e.g., one or more network ports have failed, thereby breaking link(s) between devices) that cause network devices to not be operatively connected to each other. In such scenarios, one or more network devices may no longer be operatively connected to another device within the scheme being implemented for sharing information among the network devices. This may cause the one or more devices to be "partitioned" from the other network devices for the purposes of information sharing, which may be referred to as a partition of the graph that represents the network topology. Such a partition may prevent a network from functioning or performing as intended.

DETAILED DESCRIPTION

Figure 1:
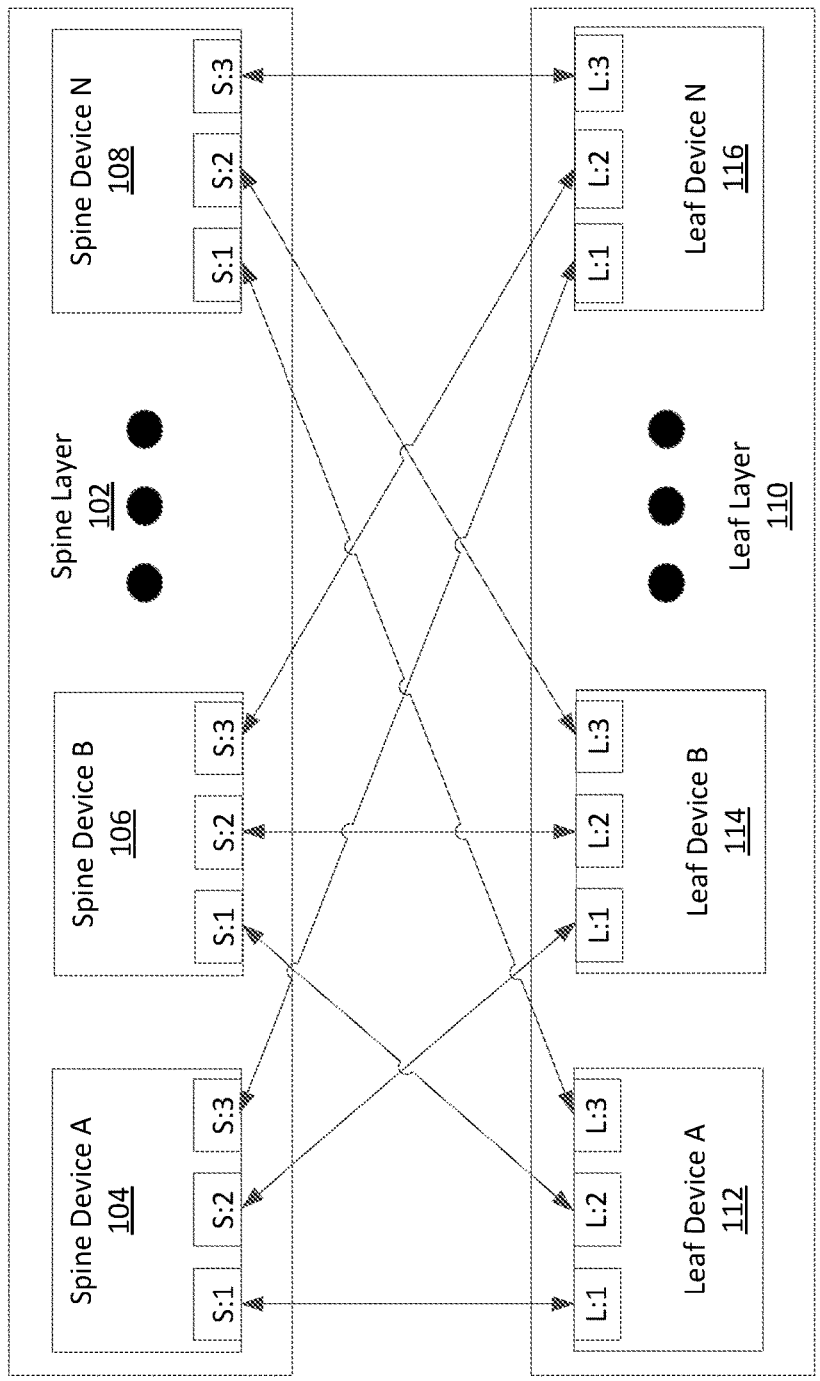
FIG. 1 shows an example of a network topology in accordance with one or more embodiments described herein.

Specific embodiments will now be described with reference to the accompanying figures.

In general, embodiments described herein relate to techniques for detecting that a graph representing a network topology, or subset therein, has become partitioned. In one or more embodiments, a graph representing a network topology may be a graph that includes all network devices in the network topology, and has all the network devices operatively connected to one another (i.e., they are all operatively connected (i.e., directly or indirectly) to each other network device in the network topology. For example, the graph may represent a subset of the actual connections between all the network devices, while still ensuring that the number of connections represented allows the topology graph to meet certain criteria. Examples of such criteria include, but are not limited to: each network device is at least bi-connected to each other network device (i.e., there are at least two paths between the network devices); the topology graph has a degree (i.e., number of connections from any network device) below a degree threshold; the topology graph has a diameter (i.e., the longest path between any two network devices) below a diameter threshold; etc. Such a topology graph may, for example, represent a topology to be used for sharing routing information among the network devices so that each network device can maintain a synchronized copy of a link state database for the network topology. As such, it may be referred to as an information sharing topology.

Use of a topology represented by a topology graph that includes only a subset of the actual connections in the network topology may, for example, reduce the amount of information being redundantly shared within the network topology, which may reduce the load on the network and the devices therein (e.g., by reducing link state packet flooding), improve network scalability, etc.

However, sharing information only on links represented as connections between nodes in such a topology graph may lead to scenarios where one or more network devices in the network topology are not receiving the information they require for the network to function as intended. Specifically, events may occur (e.g., link failures, network device failures, network devices being removed from service, links being added, network devices being added to the network topology, etc.) that lead to an outcome where the information being shared according to the topology graph no longer causes all network devices in the network topology to receive the information needed (e.g., routing information) for the network to operate as intended. In such a scenario, one or more network devices may be effectively partitioned from the other devices for the purposes of receiving the needed information.

In one or more embodiments, embodiments described herein allow for such partitions to be efficiently detected, so that corrective actions may be taken to re-join any partitioned network devices to the information sharing scheme represented, at least in part, by the topology graph. Specifically, in one or more embodiments, whenever a given network device in a network topology determines that a network topology has changed in some way, the network device initiates a procedure for determining if any one or more network devices in the network topology are partitioned from the other network devices for the purposes of sharing information, such as routing information.

In one or more embodiments, the procedure for partition detection includes obtaining, by a network device in the network topology, a representation of the topology graph, which may be represented, for example, as a set of paths. In one or more embodiments, a path is a subset of the network devices in the network topology, with the first network device in the path being directly connected to the second network device, which is connected to the third network device, and so on until the end of that particular path is reached. Accordingly, in one or more embodiments, a set of paths, when taken together, represent all of the connections between network devices represented by the topology graph that represents a subset (or all) of the connections in the network topology. In one or more embodiments, the network devices represented in a set of paths may be referred to as nodes.

In one or more embodiments, the network device then makes an assumption that all network devices (i.e., nodes) in the network topology are partitioned from each other. In one or more embodiments, the network device then selects a path from the set of paths, and checks a node database to see if the first node of the path is already present therein. In one or more embodiments, a node database is any data structure capable of including representations of any kind that have been analyzed as part of the partition detection described herein. In one or more embodiments, if the node is present, then it has already been added to a partition, which a logical grouping of one or more nodes in the node database based on the node being connected (or not) to other nodes in the node database. Such a logical partition of one or more nodes may be included as additional information in the node database, or stored as information in a separate data structure. In one or more embodiments, any one or more data structures that include node information and partition information may be collectively referred to as a partition database. In one or more embodiments, if the node is not present in the node database, a new partition is created, and the node is added to that partition.

Next, in one or more embodiments, the next node in the path is analyzed, using, for example, a link state database or a list of neighbor nodes (collectively, connectivity information). In one or more embodiments, the analysis determines whether the node is connected to the previously analyzed node.

In one or more embodiments, if the node is connected to the previous node, then the node database is checked to see if the node is present therein. In one or more embodiments, if the node is present, then a first determination is made as to the greatest union that the node is present in, and a second determination is made as to the greatest union the previous node is present in.

In one or more embodiments, a union is a logical joining of two or more partitions. In one or more embodiments, a partition may be added to a union with another partition based on at least one node in a first partition being connected (per the connectivity information) to at least one other in a second partition. In one or more embodiments, a partition may be added to an existing union of two or more partitions to make a new union of all the partitions. In one or more embodiments, unions may be joined to form new unions with all the nodes in all the partitions so joined being in the union. In one or more embodiments, the union having the most nodes (meaning all the nodes in the union are directly or indirectly connected) may be referred to as the greatest union for a node that has been analyzed and discovered to be connected to the previous node in the path being analyzed and that was already present in the node database at the time of the analysis. In one or more embodiments, a union of partitions may also be referred to as a partition, which includes all the nodes of the partitions that were joined to create the union. In one or more embodiments, such information may also be stored in the partition database.

In one or more embodiments, if the greatest union of the node being analyzed is the same as the greatest union that the previous node is in, no action is required, as the nodes are already in the same partition (which may be a union of other partitions, as discussed above). In one or more embodiments, the two greatest unions are not the same, then a new union is created that includes the two greatest unions (i.e., of the node being analyzed and the previous node, which are connected to each other). In one or more embodiments, the new union is a new partition that includes all of the nodes in the two unions that were joined.

In one or more embodiments, if the node being analyzed, which was found to be connected to the previous node, is not present in the node database, then the node is added to the node database and placed in the partition with the previous node.

In one or more embodiments, if the analysis of a node determines that it is not connected to the previous node, then the node database is consulted to determine if the node is already present therein. In one or more embodiments, if the new node is already present, then no further action is required, as the node is already in a separate partition than the previous node. In one or more embodiments, if the node is not present, then the node is added to the node database and added to a new partition.

The above-described process for the node after the first node is then repeated for each remaining node in the path, and the above described process including the first node of a path is repeated for all paths in the set of paths. In one or more embodiments, if, at the end of the analysis of all the nodes in all the paths in the set of paths leads to a partition database having two or more partitions not joined together in a union, then the information sharing topology represented by the set of paths is considered partitioned. In one or more embodiments, if the information sharing topology is partitioned, then one or more nodes therein may fail to receive information updates necessary for proper operation of the network topology. In one or more embodiments, each network device in the network topology performs the above-described analysis of partition detection In one or more embodiments, once an information sharing topology has been determined to be partitioned, corrective action, if possible, may be taken to join the two or more partitions by adding links to the information sharing topology represented by the aforementioned topology graph. As an example, such corrective action may include each network device in the network topology (all of which performed the same analysis and came to the same conclusion that the information sharing topology is partitioned) consulting their common link state database and/or local neighbor lists (connectivity information) to determine if they are, in fact, directly connected to the partitioned network device even though that connection is not represented in the set of paths that was analyzed. In one or more embodiments, if a given network device is connected to the partitioned network device, the connected network device may add, at least temporarily, the partitioned network device to the information sharing topology by adding the link between the two devices, and begin to exchange information with the now-previously partitioned network device.

In one or more embodiments, the above-described partition detection allows an information sharing topology that has become partitioned to be rapidly repaired. Such a method of partition detection may also avoid the need to have a representation of the entire information topology already existing in a data structure, which would be required, for example, to perform a depth first search or breadth first search of the information sharing topology. Not requiring an existing data structure representing the entire information sharing topology may conserve storage space on the network devices in the network topology. Such a method of partition detection may also allow the set of paths to each be analyzed only once to determine if any the information sharing topology is partitioned (e.g., as a result of a network topology change). Efficiently analyzing the set of paths only once may reduce the amount of time necessary to detect one or more partitioned network devices relative to existing methods of partition detection.

FIG. 1 shows a network topology in accordance with one or more embodiments described herein. The network topology shown in FIG. 1 is only one example of a particular network topology. One having ordinary skill in the art, and the benefit of this Detailed Description, will appreciate that the techniques described herein may apply to any network topology. Accordingly, embodiments described herein should not be considered limited to the network topology shown in FIG. 1.

As shown in FIG. 1, the network topology (100) is a spine-leaf topology that includes a spine layer (102) and a leaf layer (110). The spine layer (102) may include any number of spine devices, such as spine device A (104), spine device B (106), and spine device N (108). The leaf layer (110) may include any number of leaf devices, such as leaf device A (112), leaf device B (114), and leaf device N (116). Each of these components is described below.

In one or more embodiments, a network topology (100) is an arrangement of various elements of or within a network. In one or more embodiments, a network includes a collection of one or more network devices (e.g., spine devices (104, 106, 108), leaf devices (112, 114, 116)) that facilitate network connectivity for one or more operatively connected devices (e.g., computing devices, data storage devices, etc. (not shown)). As used herein, a network may be an entire network or any portion thereof (e.g., a logical area of network devices within the network). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, the network topology (100) is a bipartite network topology. In one or more embodiments, a bipartite network topology is a network topology in which there are at least two sets of network devices, with connections between devices of one set and devices of another set, but no connections between devices within a given set. Examples of such network topologies include, but are not limited to, a folded three-stage Clos network topology, and a spine-leaf topology. In one or more embodiments, such network topologies may be referred to as dense network topologies. In one or more embodiments, a dense network topology is a network topology (100) in which the network devices are highly interconnected, with, as an example, each device in a first set of network devices being connected to each device in a second set of network devices within the network topology. In the exemplary embodiment shown in FIG. 1, the network topology (100) is a spine-leaf topology. Although, FIG. 1 shows an example of a spine-leaf topology, in one or more embodiments, the network topology is not limited to being a spine-leaf topology (or the particular example shown), or any other example of a dense network topology set forth herein, and, as discussed above, may be any network topology in which an information sharing topology exists (e.g., for sharing routing information).

In one or more embodiments, when a network topology (100) is arranged as a spine-leaf topology, the network topology (100) includes a leaf layer (110) and a spine layer (102).

In one or more embodiments, a leaf layer (110) is a set of any number of network devices (e.g., leaf devices (112, 114, 116)) that provide network connectivity to any number of attached devices, such as computing devices (not shown). In one or more embodiments, a computing device is any device or any set of devices capable of electronically processing instructions and that includes, at least, one or more processors, memory, input and output device(s), and network connectivity via a leaf layer (110). Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer, and/or any other mobile computing device), and/or any other type of computing device with the aforementioned requirements. Other examples of devices for which a leaf layer (110) may provide network connectivity include, but are not limited to, data storage devices (not shown), other network devices (e.g., wireless routers) (not shown), media devices (e.g., televisions) (not shown), etc.

In one or more embodiments, a spine layer (102) is a set of any number of network devices (e.g., spine devices (104, 106, 108)) that provide network connectivity between network devices of a leaf layer (110), and may also be operatively connected to other network devices, such as edge routers (not shown), gateway routers (not shown), network controllers (not shown), etc. In one or more embodiments, each leaf device (112, 114, 116) within a leaf layer (110) is operatively connected to each spine device (104, 106, 108) within a spine layer (102), and each spine device (104, 106, 108) within a spine layer is operatively connected to each leaf device (112, 114, 116) within a leaf layer (110). Such connections may be referred to as creating a dense mesh (e.g., a full mesh) between the leaf layer (110) and the spine layer (102), thereby creating a dense network topology (100).

In one or more embodiments, each leaf device (112, 114, 116) and each spine device (104, 106, 108) is a network device. In one or more embodiments, a network device may be a physical device that includes and/or may operatively connected to persistent storage (not shown), memory (e.g., random access memory (RAM)) (not shown), one or more processor(s) (e.g., integrated circuits) (not shown), and two or more physical network interfaces (which may also be referred to as ports), which may provide connections (i.e., links) to other devices (e.g., other network devices participating in a routing protocol).

As shown in FIG. 1, examples of such interfaces include ports S:1, S:2, and S:3 on each spine device (104, 106, 108) and ports L:1, L:2, and L:3 on each leaf device (112, 114, 116). Although not shown in FIG. 1, leaf devices (112, 114, 116) and/or spine devices (104, 106, 108) may have any number of additional ports.

In one or more embodiments, the network device also includes any number of additional components (not shown), such as, for example, network chips, field programmable gate arrays (FPGAs), application specific integrated circuits (ASICs), indicator lights, fans, etc.

In one or more embodiments, a network device includes functionality to receive network traffic data units (e.g., frames, packets, etc.) at any of the physical network interfaces (i.e., ports) of the network device and to process the network traffic data units to determine whether to: (i) drop the network traffic data unit; (ii) process the network traffic data unit; and/or (iii) transmit the network traffic data unit, based on the processing, from a physical port of the network device in accordance with one or more embodiments.

As a non-limiting example, a network chip may be hardware that receives network traffic data units at an ingress port, and determines out of which egress port on the network device to forward the network traffic data units such as, for example, media access control (MAC) frames that may include Internet Protocol (IP) packets.

In one or more embodiments, a network device (e.g., leaf devices (112, 114, 116), spine devices (104, 106, 108)) may include functionality to store (e.g., in persistent storage, in memory, etc.), any number of data structures for facilitating operation of at least some aspects of the network device. An example of such a data structure is a link state database (not shown), which stores routing protocol information such as the state of links (e.g., are connections present) between devices in a network topology. Another example of a data structure that may be stored on a network device is a partition database (or set of databases) that is used to store partition information during a partition detection analysis (discussed further in the description of FIGS. 4-6, below).

In one or more embodiments, a link state database is a data structure for storing link state information received from neighboring network devices via the ports of a network device. In one or more embodiments, network devices within a network topology (100) (or a portion thereof (e.g., a logical area within the topology)) share link state information using any of a variety of types data units (e.g., packets, frames, messages, advertisements, etc.). Such data units may be sent from one network device to directly connected adjacent network devices, and may include information related to the state of links between the sending network device and other devices to which the sending network device is operatively connected, the state of links between other network devices in a network topology, etc.

When a data unit that includes link state information is received at a network device from an adjacent network device, the receiving network device may, in turn, propagate the data unit to its own adjacent network devices. Such sharing of link state information between network devices may occur within a network topology implementing an interior gateway protocol (IGP). Examples of an IGP include, but are not limited to, intermediate system to intermediate system (IS-IS) and open shortest path first (OSPF), each of which may be referred to as a type of IGP known as a link-state routing protocol.

In one or more embodiments, when a link-state routing protocol is implemented within a given network topology (or a portion therein), each device participating in the link-state routing topology receives, directly or indirectly, link state information from other devices in the network topology, or logical area within the network topology. In one or more embodiments, each network device uses the received information to build a map of the connectivity of network devices within the topology or logical area. Information relating to the map may be stored in the link state database.

A network device with a complete mapping of the connectivity of network devices within a topology or logical area may then use any scheme (e.g., the Dijkstra algorithm) to determine a best path (e.g., shortest path, path with the least cost, etc.) from itself to other network devices in the network topology or logical area, and such information may be stored in the link state database and/or used to program other portions of the network device (e.g., a routing information base) with information to be used, for example, when processing a received network traffic data unit. In one or more embodiments, the map of connectivity should be the same on each network device in a topology or logical area, unless one or more network devices have a change in information related to the state of one or more links. Accordingly, once a mapping has been determined, link state information may be sent from a given network device only when a change to link state information of any link of a network device occurs.

Link-state routing protocols often implement the sending of link state information to adjacent devices in a process often referred to as flooding, which is when the information is sent to each adjacent connected network device, all of which then send to each of their adjacent network devices, and so on, until all network devices have received the link state information. However, in a dense network topology (100), such flooding may lead to a large quantity of redundant data units being transmitted to network devices.

For example, in the spine-leaf network topology (100) shown in FIG. 1, if a link state change is detected on leaf device A (112), information related to the change may be flooded to each of the three spine devices (104, 106, 108). Each of the spine devices may then send the change to leaf device B (114) and leaf device N (116), each of which may send the change back to the other spine devices, etc. Such redundancy of receipt of link state information when changes occur within a dense network topology may lead to reduced performance of any given network device and/or the network topology as a whole, because each redundant data item must be processed in order to determine that it may ultimately be discarded. As an example, the packet queues (not shown) of a network device leading to a control plane (not shown) of the network device are necessarily of finite size. Therefore, if the flooding rate exceeds the update processing rate for enough time, the control plan may be obligated to drop incoming updates. If such lost updates are of significance, stabilization of the link state database and the convergence of the network may be delayed.

In one or more embodiments, the possibility of reduced performance is mitigated, at least in part, by only flooding link state change information within a computed information sharing topology, which uses only a subset of the links connecting network devices within a network topology (100). Information sharing topologies are discussed further in the description of FIG. 2, below.

In one or more embodiments, a network device also includes software and/or firmware stored in any network device storage (not shown) and/or network device memory (not shown) (i.e., non-transitory computer readable mediums). Such software may include instructions which, when executed by the one or more processors (not shown) of the network device, cause the one or more processors to perform operations in accordance with one or more embodiments. The software instructions may be in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments. The functionality of a network device is not limited to the aforementioned examples.

Examples of a network device include, but are not limited to, a network switch, a router, a multilayer switch, a fibre channel device, an InfiniBand® device, etc. A network device is not limited to the aforementioned examples.

While FIG. 1 shows a configuration of components, other configurations may be used without departing from the scope of embodiments described herein. For example, the network topology may be any network topology other than the spine-leaf topology shown in FIG. 1. As another example, the quantity of network devices in the spine layer may be less (or more) than the quantity of network devices in the leaf layer. As another example, each leaf device and each spine device may have any number of additional ports for connecting to any number of other devices, or that may not be connected to any other device at a given time. Accordingly, embodiments disclosed herein should not be limited to the configuration of components shown in FIG. 1.

Figure 2:
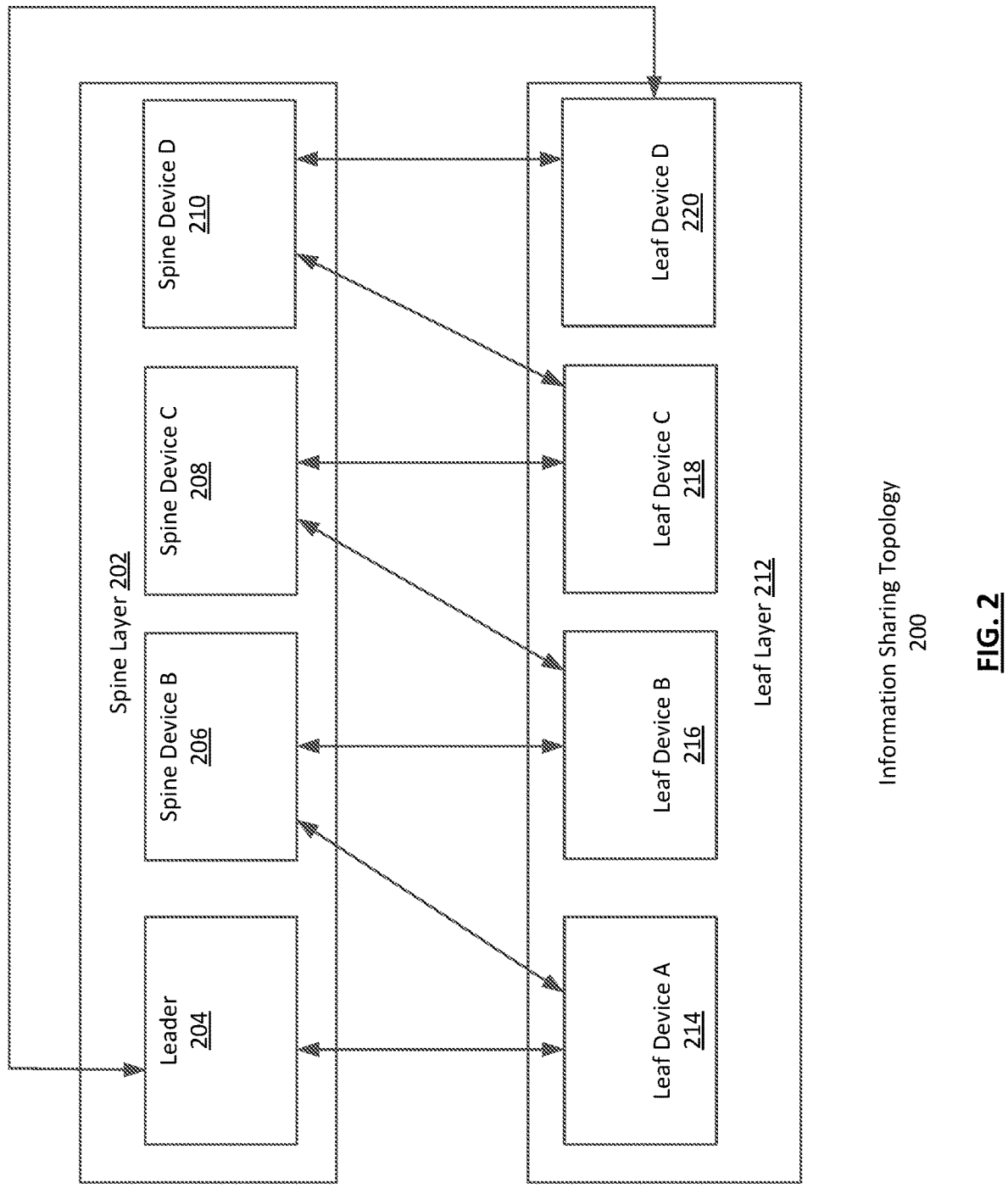
FIG. 2 shows an example of an information sharing topology in accordance with one or more embodiments described herein.

FIG. 2 shows an information sharing topology (e.g., a reduced information sharing topology) for sharing information (e.g., routing information) within a network topology in accordance with one or more embodiments described herein. The information sharing topology shown in FIG. 2 is only one example of a particular information sharing topology, and is described in the context of one example of a scheme for information between network devices using the information sharing topology. One having ordinary skill in the art, and the benefit of this Detailed Description, will appreciate that the techniques described herein may apply to any network topology and/or any scheme for sharing information within a network topology. Accordingly, embodiments described herein should not be considered limited to the information sharing topology shown in FIG. 2, or to the information sharing scheme described below and in the description of FIG. 3.

As shown in FIG. 2, the information sharing topology (200) includes a leaf layer (212) and a spine layer (202). The spine layer (202) may include a leader (204), spine device B (206), spine device C (208), and spine device D (210). The leaf layer may include leaf device A (214), leaf device B (216), leaf device C (218), and leaf device D (220). Each of these components is described below.

In one or more embodiments, the leaf layer (212) is substantially similar to the leaf layer (110) shown in FIG. 1 and discussed above. Additionally, in one or more embodiments, the spine layer (202) is substantially similar to the spine layer (102) shown in FIG. 1 and discussed above.

In one or more embodiments, each of the leaf devices (214, 216, 218, 220) and each of the spine devices (204, 206, 208, 210) are network devices and, as such, are substantially similar, respectively, to the leaf devices (112, 114, 116) and the spine devices (104, 106, 108) shown in FIG. 1 and discussed above. However, for the sake of clarity, all of the connections between each leaf device (214, 216, 218, 220) and each spine device (204, 206, 208, 210) are not shown in FIG. 2. Instead, only a subset of the connections is shown. The subset may be referred to as an information sharing topology (200).

In one or more embodiments, an information sharing topology (200) is a subset of links within a network topology that includes enough links such that there is at least one path between each network device in the topology to each other network device in the topology. In one or more embodiments, information (e.g., link state updates) are only flooded on links included in the information sharing topology (200), rather than to all links connected to adjacent network devices, which may, for example, reduce the redundancy of flooding within a network topology implementing a link-state routing protocol. In one or more embodiments, an information sharing topology (200) may include more than one path between each device and every other device. For example, as shown in FIG. 2, there are two paths between each network device and every other network device, which may be referred to as a bi-connected information sharing topology.

However, while the simple bi-connected topology shown in FIG. 2 may be adequate as an information sharing topology (200) for correctness and resiliency, such an information sharing topology may not be optimal for convergence of link state databases on each of the network devices within the topology, because the diameter (i.e., the longest path between any two network devices in a topology) of the information sharing topology may be half the number of network devices in the topology, which may cause an undesired delay in link state update propagation. Therefore, in one or more embodiments, the actual information sharing topology may have a bound on the diameter, which may be referred to as a diameter threshold.

Additionally, although FIG. 2 shows an information sharing topology (200) where each network device has two links used as part of the information sharing topology, as more redundant paths between nodes are added to an information sharing topology (200), and when attempting to keep the diameter of the information sharing topology below a diameter threshold, specific network devices may end up with more links as part of the information sharing topology than other devices. Having a high number of links as part of the information sharing topology may cause reduced performance for the network devices with a high number of links. Accordingly, when computing an information sharing topology, in one or more embodiments, the number of links within the information sharing topology (i.e., the degree) of any given network device may be bounded, which may be referred to as a degree threshold.

In one or more embodiments, at least one network device in the information sharing topology is elected as a leader (204). In one or more embodiments, a leader (204) is a network device elected using any scheme for electing a leader within a network topology of logical area of a network topology. In one or more embodiments, the leader includes functionality to compute an information sharing topology, encode the computed information sharing topology, and distribute the encoded information sharing topology within a network topology or logical area therein. Election of the leader (204), as well as computation, encoding, and distribution of information sharing topology (200), are discussed further in the description of FIG. 3, below.

While FIG. 2 shows a configuration of components, other configurations may be used without departing from the scope of embodiments described herein. For example, as discussed above, there may be more links in the subset of links that are the information sharing topology, leading to more paths between network devices (i.e., greater path redundancy). As another example, the leader may be any device in the topology, rather than a spine device as shown in FIG. 2. As another example, there may be differing numbers of devices in the spine layer and the leaf layer. As another example, there may be differing numbers of links on the various network devices that are part of the information sharing topology. Accordingly, embodiments disclosed herein should not be limited to the configuration of components shown in FIG. 2.

Figure 3:
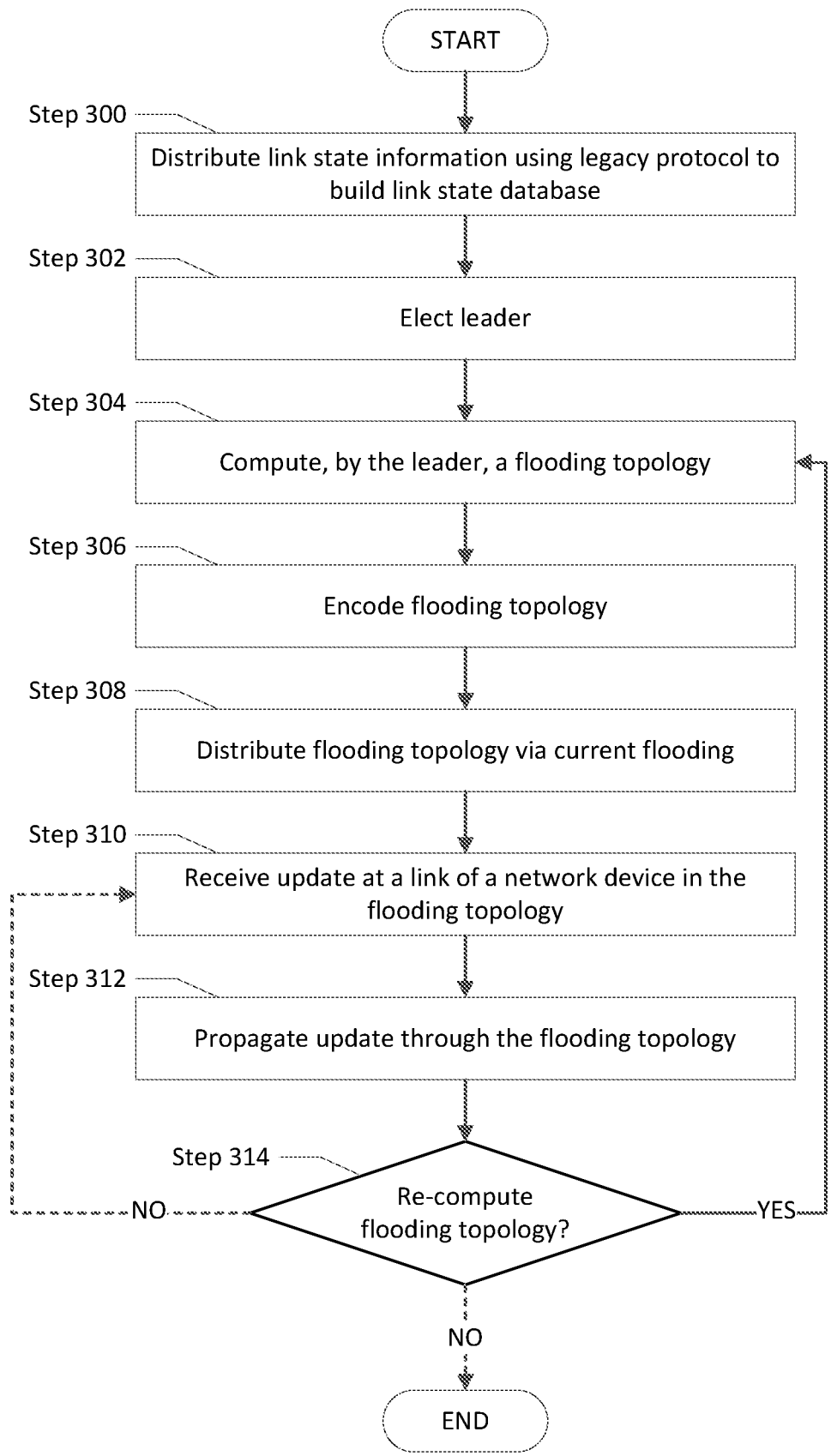
FIG. 3 shows a flowchart in accordance with one or more embodiments described herein.

FIG. 3 shows a flowchart describing a method for distributing link state updates using an information sharing topology in accordance with one or more embodiments described herein. The method for creating and using an information sharing topology shown in FIG. 3 is only one example of a particular scheme for sharing information between network devices using the information sharing topology. One having ordinary skill in the art, and the benefit of this Detailed Description, will appreciate that the techniques described herein may apply to any network topology and/or any scheme for sharing information within a network topology. Accordingly, embodiments described herein should not be considered limited to the information sharing topology creation and use shown in FIG. 3.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, link state information is distributed by each network device in a network topology in order to build a matching link state database on each network device within the network topology or logical area of a network topology. In one or more embodiments, the initial link state database is built on each network device using any link-state routing protocol scheme. For example, both OSPF and IS-IS protocols cause the network devices flood link state information from each network device to each adjacent network device. In one or more embodiments, the link state database includes information related to a mapping of the connections between all network devices within the network topology or logical area of the network topology.

In Step 302, once the link state database, including connectivity information, has been built on each network device (i.e., an initial convergence has occurred), a leader is elected from among the network devices. In one or more embodiments, the leader election may occur using any scheme for electing a single network device from among the network devices in a network topology or logical area of a network topology. Such schemes may include any manner of indicating a leader priority, which may be any identifier capable of indicating a relative priority level from among a group of network devices related to which device should be a leader network device. As an example, each network device may advertise a leader priority, and the network device with the numerically highest leader priority may be elected as the leader. In one or more embodiments, if more than one network device advertises the same highest leader priority, an election between such devices may be made using any other identifying information of the network devices. For example, from among the network devices advertising the same highest leader priority, the elected leader may be the network device with the numerically highest system identifier, internet protocol address, router identifier, etc.

In Step 304, the leader computes the information sharing topology. In one or more embodiments, computing the information sharing topology includes computing a set of links from among all the links of the network devices such that each network device has at least two paths to each other network device. Any higher (or lower) number of paths between any two network devices may be used without departing from the scope of the embodiments described herein. The determination of the number of paths between network devices, and therefore the level of redundancy of paths, may include a determination of a desired amount of path redundancy versus an acceptable level of redundant distribution of link state updates. Additionally, in one or more embodiments, computing the information sharing topology includes ensuring that the diameter of the information sharing topology does not exceed a diameter threshold. Furthermore, in one or more embodiments, computing the information sharing topology includes ensuring that any given network device within the information sharing topology does not exceed a degree threshold.

As an example, a computed information sharing topology may be referred to as a minimal information sharing topology. In one or more embodiments, a minimal information sharing topology is an information sharing topology in which the topology is at least bi-connected and each node has at least degree two, which may guarantee that the information sharing topology has no single points of failure. In a spine-leaf topology, a minimal information sharing topology may cause every leaf device in the information sharing topology to have a degree of two. As there are usually more leaf devices than spine devices in a spine-leaf topology, the degree of the spine devices may be higher than that of the leaf devices. In one or more embodiments, the higher load on the spine devices may be mitigated, at least in part, via an even distribution of the load among the individual spine devices. Accordingly, a minimal information sharing topology may scale well with a diameter that is kept below a diameter threshold.

However, there may be alternate behaviors that can be employed mitigate such risk. For example, if a leaf device sees that its single link on the information sharing topology has failed, the leaf device may compensate by performing a link state database synchronization check with a different spine device (i.e., a spine device outside the known information sharing topology). Similarly, if a leaf device determines that its connected spine device within the information sharing topology has failed, it may compensate by performing partition detection to determine if any devices in the network topology have become partitioned from the other network devices in the information sharing topology. Partition detection is discussed further in the description of FIGS. 4-6, below.

In Step 306, the information sharing topology is encoded. In one or more embodiments, the information sharing topology is encoded in any manner of encoding (i.e., representation of data) that is able to represent the connections between the links of the network devices that are included in the information sharing topology. For example, if the information sharing topology was a simple, bi-connected cycle such as that shown in FIG. 2, the information sharing topology may be encoded as a list of nodes and links in the information sharing topology, and/or as a set of paths (discussed above in the description of FIG. 1). As another example, the information sharing topology may be encoded using an adjacency matrix. In one or more embodiments, an adjacency matrix is a matrix in which rows represent one set of devices in a bipartite network and the columns represent a second set of devices in the bipartite network, with connections between devices that are included in the information sharing topology being represented at the appropriate intersection with a 1, and other intersections that are not within the information sharing topology being represented as a 0.

In Step 308, the information sharing topology is distributed to all network devices in the network topology or logical area of the network topology using a current information sharing topology. In one or more embodiments, the distribution of the information sharing topology is performed using standard flooding (e.g., flooding as used in IS-IS or OSPF) so that all network devices receive the information sharing topology. For example, the initial distribution of the information sharing topology after the information sharing topology is computed by the leader may be performed using a standard information sharing topology. In one or more embodiments, after the initial distribution of the information sharing topology, subsequent distributions (e.g., after re-computation of the information sharing topology)

may be made using the most current information sharing topology prior to the re-computation, or the newly re-computed information sharing topology. In one or more embodiments, each network device that receives the information sharing topology stores the received information sharing topology as a part of its link state database. In one or more embodiments, any change in link state information detected by any given network device is then transmitted from the network device to adjacent network devices according to the information sharing topology, and each adjacent network device that receives such an update also transmits the update via the information sharing topology.

In Step 310, a link state update is received by a network device that is a part of the information sharing topology. In one or more embodiments, the link state update is received from either another network device on a link that is included in the information sharing topology, or on a link that is outside the information sharing topology (e.g., from a network device that is not (yet) part of the information sharing topology).

In Step 312, the received link state update is propagated to adjacent network devices according to the information sharing topology. For example, if the information sharing topology dictates that the network device that received the update in Step 310 should transmit the update to two other network devices, then the link state update is transmitted to only those two devices rather than being flooded to all adjacent network devices. In one or more embodiments, each of the adjacent devices also transmits the received update according to the information sharing topology. In one or more embodiments, the process continues to transmit the link state update according to the information sharing topology until all network devices of the information sharing topology, including the leader, have received the link state update. In one or more embodiments, although not shown in FIG. 3, if the received update indicates a change in the network topology, the receiving network device performs a partition detection. Partition detection is discussed further in the descriptions of FIGS. 4-6, below In Step 314, a determination is made, by the leader, whether the information sharing topology should be re-computed. In one or more embodiments, if the leader determines that the link state update was initially sent from a network device that is already within the information sharing topology, and the update does not include a change that requires re-computation of the information sharing topology, then the information sharing topology is not re-computed, and the process may optionally end. Additionally, or alternatively, as shown in FIG. 3, the process may optionally return to Step 310 to await any additional updates that may be received.

In one or more embodiments, when the leader determines that the link state update that was received in Step 310 includes contents that indicate that an updated information sharing topology is required, then the process returns to Step 304, and the information sharing topology is re-computed, re-encoded, and re-distributed.

For example, a link status update may indicate that an information sharing topology is no longer bi-connected, which causes the leader to re-compute the information sharing topology to satisfy the condition that the information sharing topology be at least bi-connected. Other causes of information sharing topology re-computation found in link state updates, such as information related to degree threshold, diameter threshold, that all network devices (e.g., nodes) of the network topology are no longer covered, etc., may be used, alone or in combination, without departing from the scope of embodiments described herein.

In one or more embodiments, if the update causing re-computation of the information sharing topology was received from a network device already included in the information sharing topology, then the re-computed information sharing topology may be sent using the current information sharing topology prior to the re-computation or the new information sharing topology. In one or more embodiments, if the update causing the leader to re-compute an information sharing topology was received from a new network device not previously included in the information sharing topology, then the new network device from which the link state update was initially received in Step 310 is included in the updated information sharing topology, and the updated information sharing topology is distributed throughout the network (e.g., including to the new network device).

As an example of determining whether to re-compute an information sharing topology, if a link is added to the topology, the protocol being used will form a normal adjacency on the link and update the appropriate link state advertisements for the routers on either end of the link. These link state updates may then be flooded on the information sharing topology. The leader, upon receiving the updates, may choose to retain the existing information sharing topology or may choose to modify the information sharing topology. If the leader elects to change the information sharing topology, it will update the information sharing topology in the link state database and flood it using the new information sharing topology.

Figure 4:
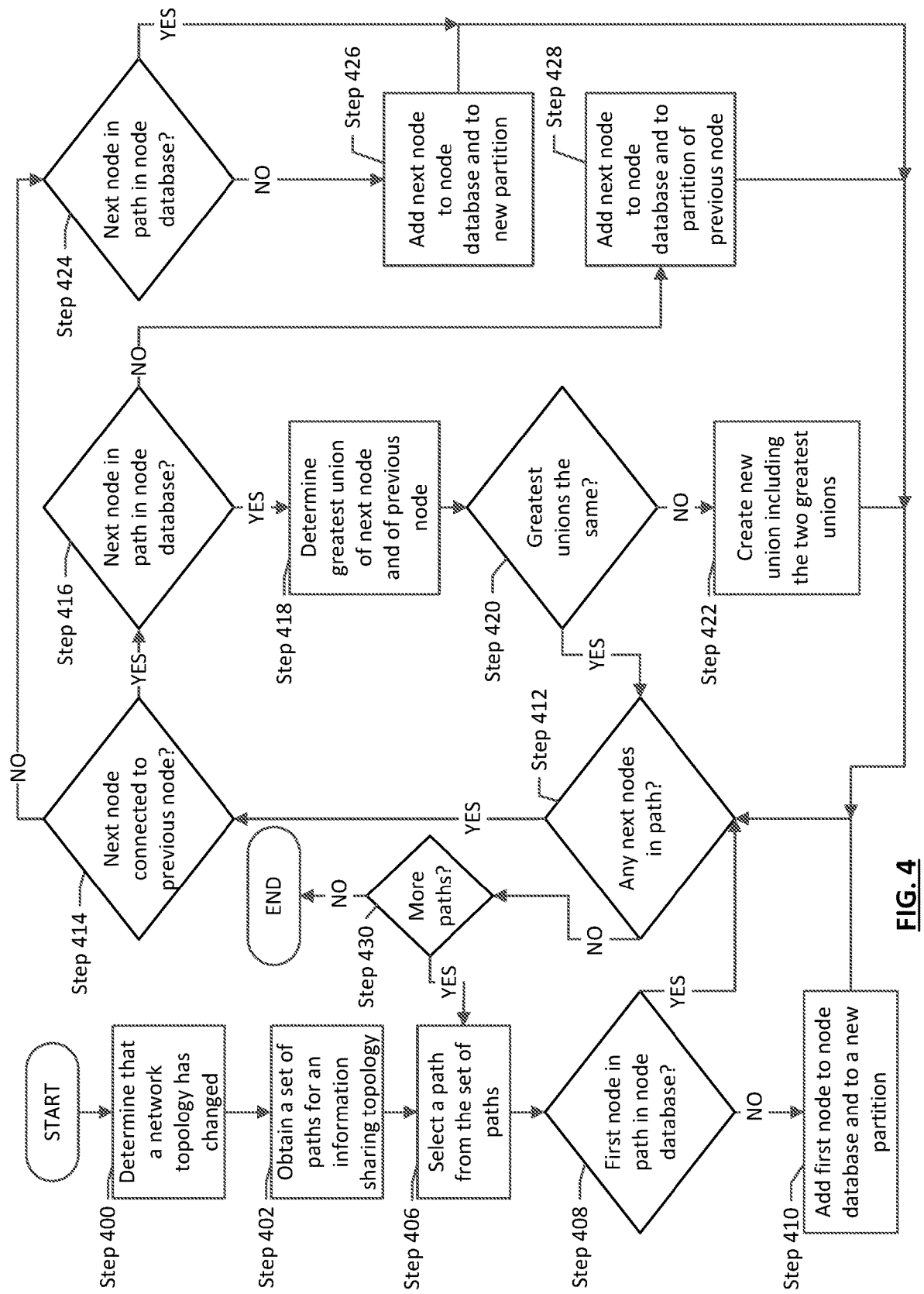
FIG. 4 shows a flowchart in accordance with one or more embodiments described herein.
Figure 5:
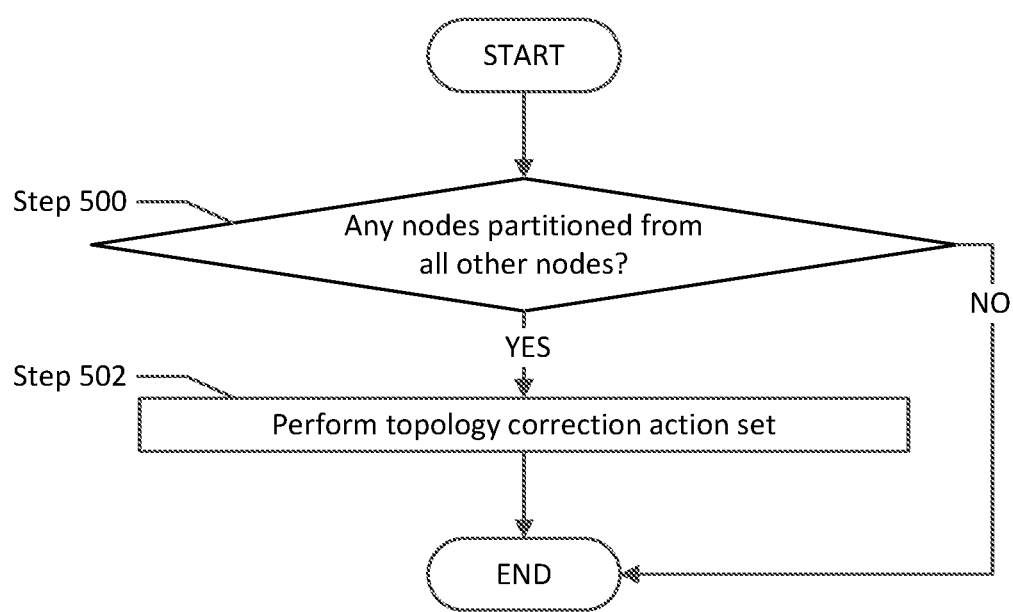
FIG. 5 shows a flowchart in accordance with one or more embodiments described herein.

FIGS. 4 and 5 show flowcharts describing a method for partition detection in accordance with one or more embodiments described herein. While the various steps in the flowchart shown in FIGS. 4 and 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 400, a network device determines that a network topology that the network device is within has changed. In one or more embodiments, detecting a change in a network topology is performed using any suitable scheme for determining that the connections between network devices in a network topology have changed in any way. As an example, a network device may receive a link state update from a neighbor device, and, using the link state database of the network device, determine that the link state update indicates that the network topology has changed. As another example, a network device may detect that a neighbor network device is no longer connected (e.g., the neighbor network device failed).

In Step 402, the network device obtains a set of paths that represent an information sharing topology. In one or more embodiments, as discussed above in the descriptions of FIG. 1 and FIG. 2, an information sharing topology is a topology within the network topology that represents how information (e.g., link state information) is to be shared among the network devices of the network topology, and may include only a subset of all links in the network topology. In one or more embodiments, as discussed above in the description of FIG. 1, the information sharing topology may be represented as a set of paths, and may, for example, be stored as part of the link state database of the network device.

In Step 406, the network device selects a path from the set of paths. In one or more embodiments, any path in the set of paths is suitable to be the first path or next path selected for analysis. The network device may select the path using any scheme for selecting a single instance from a group of such instances.

In Step 408, a determination is made whether the first node in the path selected in Step 406 is present in a node database. As described above, in one or more embodiments, a node database is any data structure capable of including representations of any kind that have been analyzed as part of the partition detection described herein. In one or more embodiments, if the node is present, then it has already been added to a partition, which a logical grouping of one or more nodes in the node database based on the node being connected (or not) to other nodes in the node database. Such a logical partition of one or more nodes may be included as additional information in the node database, and/or stored as information in a separate data structure. In one or more embodiments, any one or more data structures that include node information (i.e., the node database) and partition information may be collectively referred to as a partition database. In one or more embodiments, if there the first node is already present in the node database, then the method proceeds to Step 412. In one or more embodiments, if the node is not present in the node database, then the method proceeds to Step 410.

In Step 410, in one or more embodiments, if the node is not present in the node database, the node is added to the node database, a new partition is created, and the node is added to that partition. In one or more embodiments, the network device, after determining that the network topology is changed in Step 400, is programmed to make an assumption that each node in the information sharing topology has become partitioned from all other nodes in the information sharing topology. In response to the assumption, the network device, after determining that the first node of the selected path is not already in a node database, creates a new partition to include the node, and stores that partition in a database. In one or more embodiments, a partition is a data representation of one or more nodes in an information sharing topology. In one or more embodiments, if there are more than one node in a given partition, then the collection of nodes is operatively connected, with each node having a direct connection to at least one other node in the partition. In one or more embodiments, after adding the node to the node database and to a new partition, the method proceeds to Step 412.

In Step 412, a determination is made whether the path has any next nodes. In one or more embodiments, a path has a next node if there is another node in the path that the path indicates should be a neighbor of the previous node in the path (i.e., the next node is a neighbor of the previous node). In one or more embodiments, if there is a next node, the method proceeds to Step 414. In one or more embodiments, if there is no next node in the path, the method proceeds to Step 430.

In Step 414, a determination is made as to whether the next node of the path found in Step 412 is connected to the previous node in the path (i.e., it is a neighbor of the previous node). In one or more embodiments, the determination is made using a connectivity information from a data structure (e.g., a link state database, a neighbor list, etc.) of the network device that includes information relating to whether network devices are neighbors to one another (i.e., are directly connected to one another). In one or more embodiments, if the next node is a neighbor of the previous node, the method proceeds to Step 416. In one or more embodiments, if the next node is not a neighbor of the previous node, the method proceeds to Step 424.

In Step 416, a determination is made whether the next node is in the next node database. In one or more embodiments, if the next node is in the node database, the method proceeds to Step 418. In one or more embodiments, if the next node is not in the next node database, the method proceeds to Step 424.

In Step 418, the greatest union of the next node, and the greatest union of the previous node analyzed are computed. As discussed above, in one or more embodiments, a union is a logical joining of two or more partitions. In one or more embodiments, a partition may be added to a union with another partition based on at least one node in a first partition being connected (per the connectivity information) to at least one other in a second partition. In one or more embodiments, a partition may be added to an existing union of two or more partitions no make a new union of all the partitions being so joined. In one or more embodiments, unions may be joined to form new unions with all the nodes in all the partitions so joined being in the new union. In one or more embodiments, the union having the most nodes (meaning all the nodes in the union are directly or indirectly connected) may be referred to as the greatest union for a node that has been analyzed and discovered to be connected to the previous node in the path being analyzed and that was already present in the node database at the time of the analysis. In one or more embodiments, a union of partitions may also be referred to as a partition, which includes all the nodes of the partitions that were joined to create the union. In one or more embodiments, such information may also be stored in the partition database.

In Step 420, a determination is made whether the greatest union of the next node and the greatest union of the previous node are the same. In one or more embodiments, greatest unions are the same if they include the same set of nodes. In one or more embodiments, if the greatest union of the node being analyzed is the same as the greatest union that the previous node is in, no action is required, as the nodes are already in the same partition (which may be a union of other partitions, as discussed above). In one or more embodiments, if the greatest unions are the same, the method returns to Step 412 to check for additional nodes. In one or more embodiments, if the two greatest unions are not the same, then the method proceeds to Step 422.

In Step 422, a new union is created that includes the two greatest unions (i.e., of the node being analyzed and the previous node, which are connected to each other). In one or more embodiments, the new union is a new partition that includes all of the nodes in the two unions that were joined. In one or more embodiments, after the new union is created, the next node and the previous node are in the same partition that is the new union. Accordingly, the method then returns to Step 422 to check for additional nodes.

In Step 424, after determining that the next node is not connected to the previous node in Step 414, a determination is made whether the next node is in the node database. In one or more embodiments, if the next node is in the node database, then the node is already in a partition, so no further action is necessary with respect to the node, and the method returns to Step 412 to check for additional nodes. In one or more embodiments, if the next node is not in the node database, the method proceeds to Step 426.

In Step 426, in one or more embodiments, if the next node is not present in the node database, the node is added to the node database, a new partition is created, and the node is added to that partition. In one or more embodiments, after adding the node to the node database and to a new partition, the method returns to Step 412 to check for additional nodes.

In Step 428, after determining that the next node is connected to the previous node in Step 414, but that the node is not in the node database in Step 416, the node is added to the node database, and added to the partition of the previous node. In one or more embodiments, after adding the node to the node database and to the partition of the previous node, the method returns to Step 412 to check for additional nodes.

In Step 430, once a determination is made that there are no next nodes in a path being analyzed by the network device, a determination is made whether the set of paths includes any additional paths. In one or more embodiments, if there are additional paths, the method returns to Step 406, another path is selected and analyzed as described above. In one or more embodiments, if there are no paths, the method ends.

One having ordinary skill in the art, and the benefit of this Detailed Disclosure, will appreciate that although FIG. 4 shows a method to be performed in response to a single determination that a network topology has changed, the method may be repeated each time such a network topology change is detected. Additionally, one having ordinary skill in the art, and the benefit of this Detailed Disclosure, will appreciate that although FIG. 4 shows the method as performed on one network device, the method may be performed on all or any portion thereof of network devices in a network topology.

Continuing with FIG. 5, in Step 500, a determination is made as to whether there are any nodes that are partitioned from other all other nodes. In one or more embodiments, the determination is made by assessing the partition database to determine if, after performing the partition detection discussed above in the description of FIG. 4, there are two or more partitions that exist that have not been joined in a union. For example, if the partition detection found a partition A, a partition B, a partition C, and a partition D, partitions A and B had been joined in a union to create partition E, and partitions D and C had been joined to create partition F, but partitions E and F were not joined, then the information sharing topology is partitioned. In one or more embodiments, if the information sharing topology is partitioned, the method proceeds to Step 502. In one or more embodiments, if there are no partitioned nodes, then the information sharing topology is still functional (i.e., all nodes should be receiving the information being shared among the nodes), and the method ends.

In Step 502, a topology correction action set is performed. In one or more embodiments, a topology correction action set is any one or more actions that may lead to a repair of the information sharing topology, such that all network devices that should be in the information sharing topology are receiving the information being shared. An example of such an action set is for each device in the network topology that performed the partition detection to consult its database of connectivity information (e.g., link state database) to determine if it has a connection to one or more partitioned devices and, if so, to add, at least temporarily, a link to the information sharing topology that spans the partitions, thereby causing the relevant information being shared to be exchanged with the partitioned one or more nodes.

Figure 6:
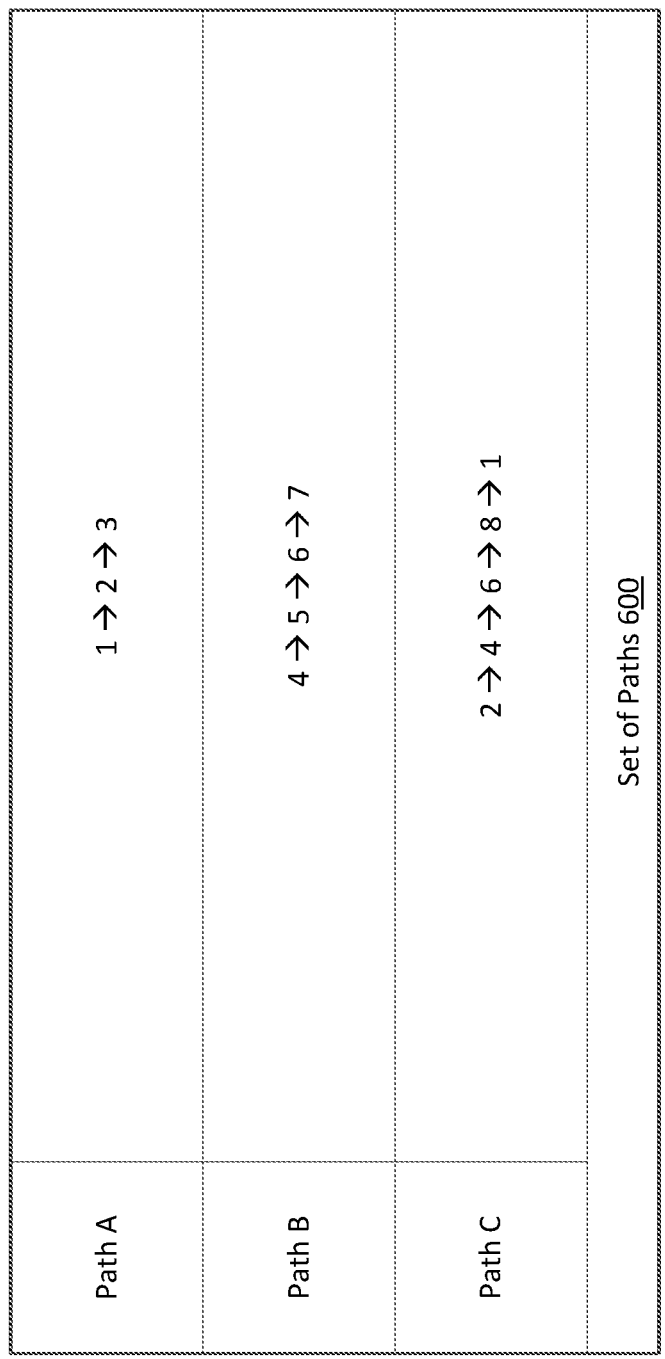
FIG. 6 shows an example in accordance with one or more embodiments of described herein.

FIG. 6 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 6, consider a scenario in which an area leader of a network topology has previously distributed a set of paths (600) that includes three paths that collectively represent an information sharing topology within a network topology, and the set of paths (600) has been received by a network device (not shown) in the network topology (not shown) that includes nodes (not shown) numbered 1-8. In this scenario, although each of nodes 1-8 will perform a partition detection, this example will be from the perspective of the network device that is node 5 in the information sharing topology represented by the set of paths.

Path A indicates that node 1 should be connected to node 2, and node 2 should be connected to node 3. Path B indicates that node 4 should be connected to node 5, node 5 should be connected to node 6, and node 6 should be connected to node 7. Path C indicates that node 2 should be connected to node 4, node 4 should be connected to node 6, node 6 should be connected to node 8, and node 8 should be connected to node 1.

In this scenario, the following links become broken: the link between 5 and 6, the link between 6 and 8, and the link between 8 and 1. The network device receives at least one link state update from a neighbor device, and uses the link state database to determine that, indeed, a network topology change has occurred. Therefore, in response to the determination, the network device begins a partition detection process.

The network device then selects the Path A (1→2→3). The network device begins with node 1 (first node in path A), and assign it a partition A (not shown).

Next, the network device consults its link state database, and finds that it shows that node 2 is connected to node 1, so node 2 is placed into partition A with node 1.

Next, the network device consults its link state database, and finds that it shows that node 3 is connected to node 2, so node 3 is placed into partition A with node 1 and node 2.

Next, the network device determines that there are no more nodes in path A, so the network device moves on to Path B (4→5→6→7).

Next, the network device determines that node 4 is not in partition A, so the network device creates partition B, and puts node 4 in partition B.

Next, the network device consults its link state database, and finds that it shows that node 5 is connected to node 4, so node 5 is placed into partition B with node 4.

Next, the network device consults its link state database, and finds that it shows that node 6 is not connected to node 5, and that node 6 is not in any existing partition, so the network device creates partition C (not shown), and node 6 is placed into partition C.

Next, the network device consults its link state database, and finds that it shows that node 7 is connected to node 6, so node 7 is placed into partition C with node 6.

Next, the network device determines that there are no more nodes in path B, so the network device moves on to Path C (2→4→6→8→1).

Next, the network device determines that node 2 is already in partition A, so no action is required Next, the network device consults its link state database, and finds that it shows that the link between node 4 and node 2 is working (they are neighbors in the link state database). The network device then consults the partition database to discover that node 2 is in partition A, and node 4 is in partition B, so we create partition D (not shown) to create a union between partition A and partition B that includes nodes 1-5.

Next, the network device consults its link state database, and finds that it shows that the link between node 6 and node 4 is working (they are neighbors in the link state database). The network device then consults the partition database to discover that node 4 is in partition D, and node 6 is in partition C, so we create partition E to create a union between partition D and partition C that includes nodes 1-7.

Next, the network device consults its link state database, and finds that it shows that node 8 is not connected to node 6, and that node 8 is not in any existing partition, so the network device creates partition F (not shown), and node 8 is placed into partition F.

Next, the network device consults its link state database, and finds that it shows that node 1 is not connected to node 8, but that node 1 is already in partition A, so no action is taken.

Figure 7:
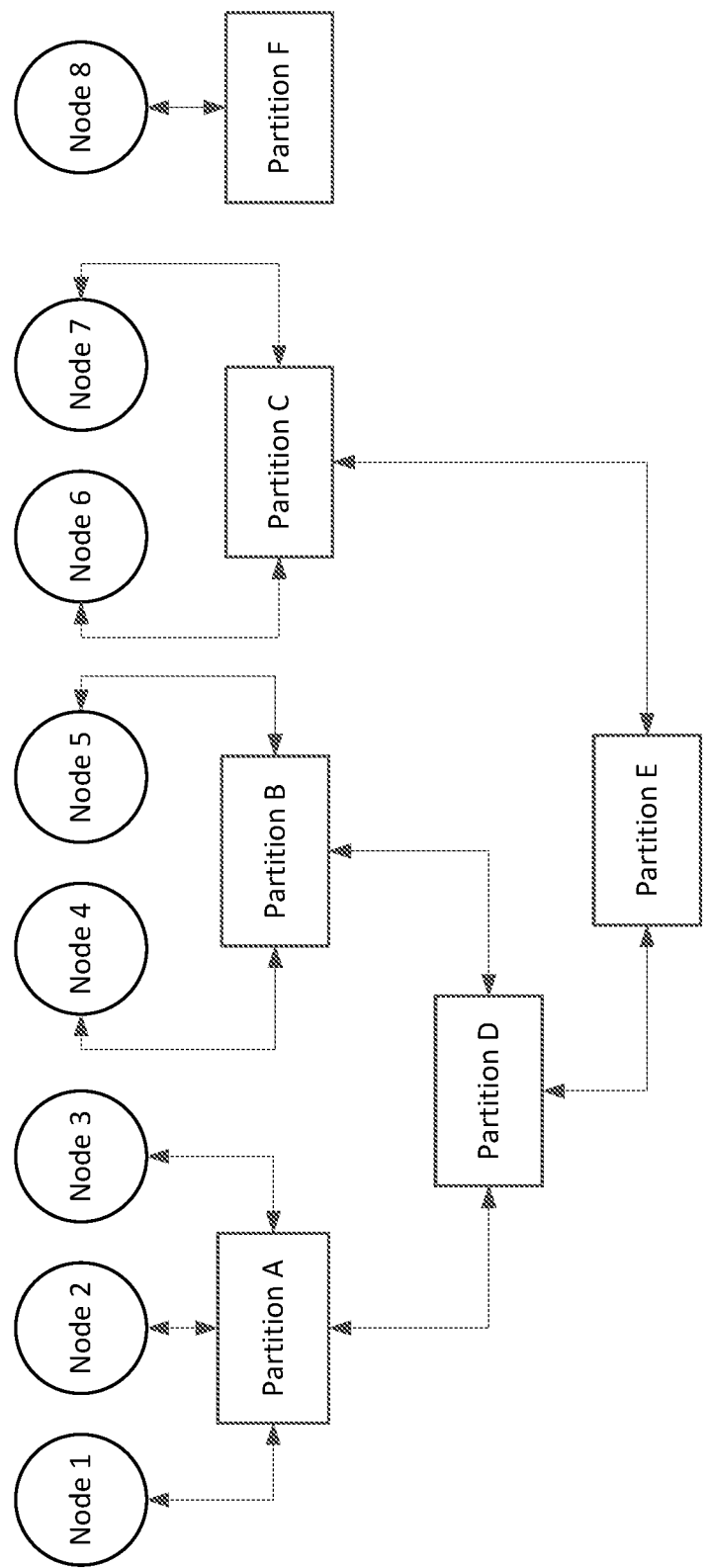
FIG. 7 shows an example in accordance with one or more embodiments of described herein.

A graphic representation of the results of the above-described partition detection is shown in FIG. 7 as partitioned information sharing topology (700)

Based on the above-described partition detection, the network device that is node 5 has determined that node 8 is partitioned from the other devices in the information sharing topology. Accordingly, node 5 consults its link state database and determines that although it is not shown as connected to partitioned node in the set of paths, it is, in fact, physically a neighbor of node 8. Therefore, node 5 adds the link to node 8 to the information sharing topology and begins exchanging link state updates with node 8, thereby repairing the partitioning of the information sharing topology.

Example Embodiments

In general, in one aspect, embodiments described herein relate to a method for topology partition detection. In one or more embodiments, the method includes making a first determination, by a network device of a network, that a topology of the network has changed; obtaining, based on the first determination, a set of paths from a current topology for the network; assigning a first node of a first path of the set of paths to a first partition; making a second determination, using the first path, that a second node should be connected to the first node; making a third determination, using connectivity information of the network device, that the first node and the second node are neighbors; and assigning, based on the third determination, the second node to the first partition.

In general, in one aspect, embodiments described herein relate to a method for topology partition detection. In one or more embodiments, the method includes making a first determination, by a network device in a network, that a topology of the network has changed; obtaining, by the network device and based on the first determination, a set of paths from a current topology for the network; and performing, by the network device, a partition detection action set using the set of paths and a link state database of the network device, wherein the partition detection action set determines whether the current topology is partitioned.

In general, in one aspect, embodiments described herein relate to a non-transitory computer readable medium including instructions that, when executed by a processor, perform a method for topology partition detection. In one or more embodiments, the method includes making a first determination, by a network device in a network, that a topology of the network has changed; obtaining, by the network device and based on the first determination, a set of paths from a current topology for the network; and performing, by the network device, a partition detection action set using the set of paths and a link state database of the network device, wherein the partition detection action set determines whether the current topology is partitioned.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A method for topology partition detection, the method comprising:
  making a first determination, by a network device of a network, that a topology of the network has changed;

obtaining, based on the first determination, a set of paths from a current topology for the network;
assigning a first node of a first path of the set of paths to a first partition;
making a second determination, using the first path, that a second node should be connected to the first node;
making a third determination, using connectivity information of the network device, that the first node and the second node are neighbors;
assigning, based on the third determination, the second node to the first partition;
making a fourth determination, using the first path, that a third node in the first path should be connected to the second node;
making a fifth determination, using the connectivity information, that the second node and the third node are not neighbors; and
assigning, based on the fifth determination, the third node to a second partition;
making a sixth determination, using a second path of the set of paths and the connectivity information that the second node and the third node are neighbors and should be connected;
merging, based on the sixth determination, the first partition and the second partition into a third partition comprising the first node, the second node, and the third node;
making a seventh determination that a fourth node of a third path of the set of paths is not in the first partition;
assigning, based on the seventh determination, the fourth node to a fourth partition;
making an eighth determination that the third path does not include any nodes that should be connected to the first node, the second node, or the third node;
making a ninth determination, based on the eighth determination, that the current topology is partitioned into the third partition and the fourth partition; and
performing, based on the ninth determination, a topology repair action set.

2. The method of claim 1, wherein performing the topology repair action set comprises:
performing an analysis on the connectivity information to determine that the fourth node and the first node are neighbors; and
repairing, based on the analysis, the current topology by updating the current topology to add a link between the fourth node and the first node, wherein adding the link allows for transmitting link state information between the first node and the fourth node.

3. A method for topology partition detection, the method comprising:
making a first determination, by a network device in a network, that a topology of the network has changed;
obtaining, by the network device and based on the first determination, a set of paths from a current topology for the network; and
performing, by the network device, a partition detection action set using the set of paths and a link state database of the network device, to detect that the current topology is partitioned into a first partition and a second partition,
performing, in response to detecting that the current topology is partitioned, a topology repair action set,
wherein performing the topology repair action set comprises:
making a second determination, using the set of paths, that a first node in the first partition and a second node in the second partition are not connected in the current topology;
performing an analysis, using the link state database, to determine that the first node is a neighbor of the second node; and
repairing, based on the analysis, the current topology by transmitting link state information between the first node and the second node.

4. The method of claim 3, wherein performing the partition detection action set comprises:
assigning the first node of a first path of the set of paths to the first partition;
making a third determination, using the first path, that the second node should be connected to the first node;
making a fourth determination, using the link state database, that the first node is the neighbor of the second node; and
assigning, based on the third determination and the fourth determination, the second node to the first partition with the first node.

5. The method of claim 3 further comprising:
performing, by the network device in response to the first determination, an analysis to determine routes to each of a plurality of other network devices in the network.

6. The method of claim 3, wherein making the first determination comprises receiving a link state update from a second device of the network.

7. The method of claim 3, wherein making the first determination comprises receiving an updated topology.

8. The method of claim 3, wherein the link state database comprises link state information indicating whether nodes of the current topology are neighbors.

9. A non-transitory computer readable medium comprising instructions that, when executed by a processor, perform a method for topology partition detection, the method comprising:
making a first determination, by a network device in a network, that a topology of the network has changed;
obtaining, by the network device and based on the first determination, a set of paths from a current topology for the network;
performing, by the network device, a partition detection action set using the set of paths and a link state database of the network device to detect that the current topology is partitioned into a first partition and a second partition; and
performing, in response to detecting that the current topology is partitioned, a topology repair action set,
wherein performing the topology repair action set comprises:
making a second determination, using the set of paths, that a first node in the first partition and a second node in the second partition are not connected in the current topology;
performing an analysis, using the link state database, to determine that the first node is a neighbor of the second node; and
repairing, based on the analysis, the current topology by transmitting link state information between the first node and the second node.

10. The non-transitory computer readable medium of claim 9, wherein performing the partition detection action set comprises:
assigning the first node of a first path of the set of paths to the first partition;

making a third determination, using the first path, that the second node should be connected to the first node;

making a fourth determination, using the link state database, that the first node is the neighbor of the second node; and assigning, based on the third determination and the fourth determination, the second node to the first partition with the first node.

11. The non-transitory computer readable medium of claim 9, wherein the method further comprises:

performing, by the network device in response to the first determination, an analysis to determine routes to each of a plurality of other network devices in the network.

12. The non-transitory computer readable medium of claim 9, wherein making the first determination comprises receiving a link state update from a second device of the network.

13. The non-transitory computer readable medium of claim 9, wherein making the first determination comprises receiving an updated topology.

14. The non-transitory computer readable medium of claim 9, wherein the link state database comprises link state information indicating whether nodes of the current topology are neighbors.

* * * * *